Jan. 15, 1935.  R. W. DAVIS  1,987,606
COMBINED FRONT AND REAR PROPELLING AND STEERING MECHANISM FOR AIRCRAFT
Original Filed Aug. 4, 1931
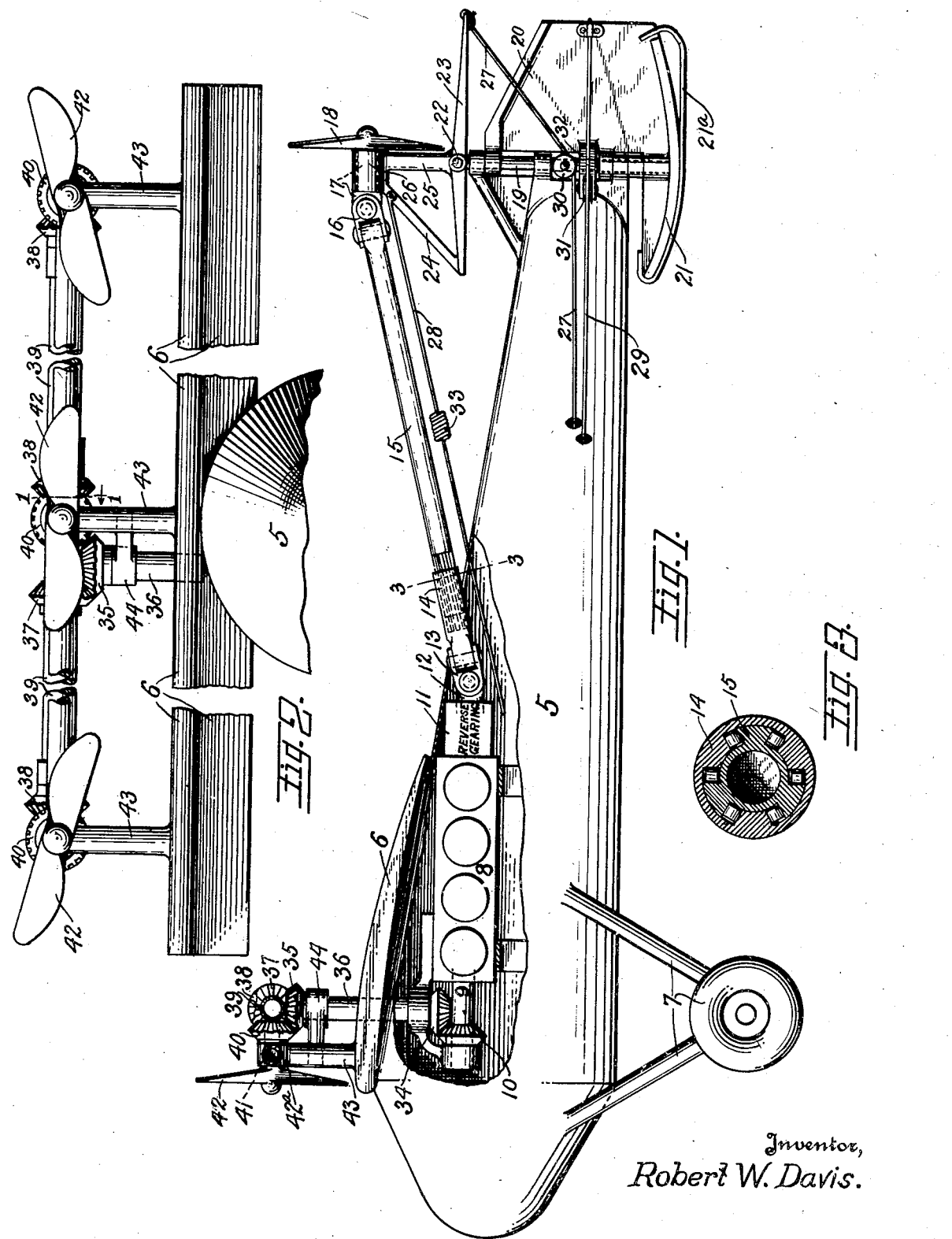
Inventor,
Robert W. Davis.
By Sterling P. Buck,
Attorney.

Patented Jan. 15, 1935

1,987,606

UNITED STATES PATENT OFFICE 1,987,606

COMBINED FRONT AND REAR PROPELLING AND STEERING MECHANISM FOR AIRCRAFT

Robert W. Davis, Milwaukee, Wis., assignor of twenty per cent to Sterling P. Buck Application August 4, 1931, Serial No. 555,062
Renewed May 25, 1934

9 Claims. (Cl. 244—25)

This invention relates to a combined front and rear propelling and steering combination for air craft; and it is especially useful on monoplanes having front propellers disposed in a row or line above the leading edge of the plane or wings.

One object of the invention is to provide means for perfectly controlling the longitudinal inclination of the craft for maintaining it at an angle that maintains equilibrium and enables the craft to hover and to slowly descend vertically so as to land on a mountain peak, a ship's deck or in a street or road.

Another object is to enable the craft to maintain any desired and proper angle to the earth's axis while hovering over any point on the earth or while moving at any desired slow rate of motion or speed.

Another object is to provide an air craft device or combination that is comparatively simple, safe, light, and easily operated and controlled.

Another object is to provide an improved splined joint for the rear propeller-shaft, so the latter can be lengthened and shortened with the minimum resistance to manipulations of the "stick" or steering actuator.

Other objects and important features are pointed out or implied in the following details of description, in connection with the accompanying drawing in which:

Fig. 1 is a left side elevation of a monoplane which includes my steering combination, a part of the fuselage being broken away to show the engine or motor and its connections with the front and rear propellers, one or more of the front propellers and supports thereof being omitted, and parts being in section at the line 1—1, Fig. 2.

Fig. 2 is a front view of the upper part of the craft, parts being broken out at opposite sides of the fuselage.

Fig. 3 is an enlarged sectional view showing the splined joint at the line 3—3 of Fig. 1.

Referring to the drawing in detail, in which similar reference characters refer to similar parts in the several views, and explaining that many of the parts are shown conventionally, the invention is explained in detail as follows:

The fuselage is shown at 5, the wings or plane at 6, the landing gear at 7, and the engine or motor at 8, all these being of usual or any proper and desired form or type. The engine or motor 8 has a rotary shaft 9 which carries a gear-wheel or miter-gear 10 at its front end, and has its rear end connected to a reverse-gearing or reversing gear 11. A stub-shaft 12 extends rearward from the reverse-gearing 11 and unites with a universal joint 13 to which a tubular splined joint-member 14 is connected. A propeller-shaft 15 has its front end splined and longitudinally movable in the member 14 while its rear end is united with a universal joint 16 that connects to the stub-shaft 17 that carries the rear propeller 18. An upright shaft or axle 19 is journalled in the tail of the fuselage 5 and carries the rudder 20 and a guiding skid or runner 21. A rear propelling and guiding unit is pivoted at 22, on the top of the upright supporting shaft 19; this propelling and guiding unit comprises a plane 23, uprights 24 and 25, and a bearing 26 which carries the propeller-shaft 17. Wires or other flexible connections 27 and 28 are suitably connected to the unit 23—26 for turning this unit on its pivot and holding it in its adjusted positions on the pivot, and these wires may have their front ends connected to a "stick" (not shown) or to any appropriate manipulative controlling device. Wires or other flexible elements 29 may have their front ends connected to a second "stick" or controlling device or to the same controlling unit as that to which the wires 27 and 28 are connected, as conditions may require, and the rear ends of these wires 29 are suitably connected to the rudder 20, for actuating the latter. Only one of the wires 20 is here shown, the other being hid by the fuselage and rudder. Guiding pulleys 30 and 31 are carried by the arms 32 that extend out horizontally from opposite sides of the tail of the fuselage, and these pulleys engage and cooperate with the wires 27 and 29, respectively, by guiding them and retaining them in their useful positions. Any or all of the controlling wires may have a spring, as at 33, to assure proper tension at all adjustments of the parts controlled thereby.

Referring again to the engine or power source 8 and its driving shaft 9 and wheel 10, it is seen that the latter is part of a transmission gearing that also includes gear-wheels 34 and 35 on an upright shaft 36, gear-wheels 37 and 38 on a horizontal shaft 39, and gear wheels 40 on the respective stub shafts 41 that carry the front propellers 42 of which there may be any appropriate number, although only three are here shown. The stub shafts 41 are journaled in bearings 42a in uprights 43. The centrally disposed one of these uprights also carries a bearing 44 for the shaft 36. It is seen, therefore, that all the front propellers are alined over the leading edge of the plane 6, in close proximity thereto, and are provided with a universal or common operating mechanism by which each is driven at the same speed as the others. However, it is preferable that the propellers on the right wing of the front plane have their blades inclined inversely to those on the left wing, and they may be forwardly turned clockwise and counterclockwise, respectively, so as to equalize or approximately equalize the torque. According to Fig. 2, there is a central front propeller and an even number of lateral propellers, so there is an odd number of the front propellers, but it is quite within the scope of this invention to dispense with the central front propeller so there will be an even total number of the front propellers, so the torque of this front set of propellers will be fully equalized.

The reverse-gearing 11 may be of any appropriate novel or previously known kind or type which includes a friction clutch and which can be put into forward, neutral, and reverse, at will of the operator or pilot of the craft. By the term "forward", is meant the direction tending to propel the craft forward; and by the term "reverse", is meant the direction that tends to force the craft backward or to retard its forward movement.

The principles of operation include the physical principle that an air current tends to produce a vacuum at the sides of the stream or current. This principle is applied by placing the propellers over the planes 6 and 23, and is made most effective by turning all the propellers, front and rear, in the forwardly propelling direction at the same time so the rear propeller boosts the current produced by the front propellers, by suction of the rear propeller. By thus creating a partial vacuum over the fuselage and planes, the air, tending to rise and fill the partial vacuum, exerts a lifting force on the craft and assists in causing it to hover, or descend slowly and perpendicularly, as desired. It should be understood, however, that the front end must be kept well elevated, higher than the tail, when hovering or descending vertically, the same as when ascending steeply, and that the required elevation or inclination is obtained and maintained by adjusting the controlling unit 23—26; for although the rear plane (which serves as an elevator when the craft is traveling forward) is (of itself) relatively ineffective when hovering, a forward tilting of the rear propeller (from the position shown) while running backward, will tend to raise the tail of the fuselage or to cooperate with the plane 23 for raising it. Therefore, by keeping the part 23—26 properly adjusted, the craft can be kept with its front end at such elevation that the tendency of the craft will be to slide backward, but the forward pull of the series of front propellers will overcome such sliding tendency, and when run at the proper speed, will cause the craft to hover in mid air; if run at a lower speed, will cause it to settle or descend slowly and vertically on a landing place; but if run at a greater speed when the rear propeller is running forward and when the unit 23—26 is substantially at the position shown, the craft will ascend and move forward.

When flying fast, if it suddenly becomes desirable to land perpendicularly or nearly so, the front end of the craft is elevated by tilting the elevator 23 forward so it tends to further depress the tail of the craft; so, to offset this tendency and to assist the front propellers in the upward lifting of the craft, the reversing gear 11 is operated for reversing the rear propeller, and thereby slowing the forward movement of the craft, while combining with the front propellers for exerting a lifting tendency; but by slowing the speed of all the propellers, the force of gravity overcomes the lifting tendency, while the latter can be so regulated that the craft will settle gradually and almost vertically to the landing place.

It should be understood that all the shafts and beams may be hollow so as to be relatively light and rigid, and that the runner 21 may be provided with a cushioning spring 21a to touch the landing spot when the front end is elevated while landing. Furthermore, the runner 21 serves to guide the craft while taxiing.

I have no intention to limit my patent protection to the exact construction and arrangement here shown, for the invention is susceptible of numerous changes within the scope of the inventive ideas as implied and claimed.

What I claim as my invention is:

1. In an airplane, the combination of a fuselage, a plane on the front top part of the fuselage, propellers mounted on said plane, a rear propeller pivotally mounted at the rear end of said fuselage, means to adjust said rear propeller forward and rearward on its pivotal support independently of the front propellers, and operating means to connect all of said propellers and to rotate them in unison, said operating means including a driving member in the fuselage, and a transmission member extending up from the driving member through said plane and geared to said propellers that are on said plane.

2. In an airplane, the combination of a fuselage, a plane on the front part of the fuselage, propellers mounted on the top of said plane, an elevator on the rear part of the fuselage, a propeller mounted on the top of said elevator for movement therewith, means to tilt said elevator and rear propeller forward and rearward, and operating means to rotate all of said propellers in unison.

3. In an airplane, the combination of a fuselage, a plane on the front part of the fuselage, a propeller at the front part of the fuselage, a rudder, an upright shaft journalled in bearings at the rear end of the fuselage and carrying the rudder, a supporting unit pivoted on the upper end of said upright shaft and turnable therewith and tiltable forward and rearward thereon, a rear propeller on said supporting unit and tiltable therewith, power producing means carried by the fuselage, and transmission means operatively connecting said power producing means to said rear propeller.

4. The structure defined by claim 3, said transmission means comprising a propeller-shaft which includes universal joints and a splined longitudinally adjusting joint, substantially as shown.

5. The structure defined by claim 3, and an elevator pivoted on said upright shaft and turnable therewith and tiltable thereon.

6. The structure defined by claim 3, and a reverse-gearing operatively connected to said power producing means and to said transmission means so the latter can be turned thereby in opposite directions for the purposes specified.

7. The structure defined by claim 3, transmission means connecting said power producing means to the first said propeller for rotating it forwardly, and a reverse-gearing operatively connected to said power producing means and to the first said transmission means so the latter can be turned thereby for turning the rear propeller in the same direction as the first said propeller and can be reversed to turn in the opposite direction while the power-producing means remains unchanged as to its direction of turning.

8. The structure defined by claim 3, the first said propeller being mounted substantially over the leading edge of said plane and provided with a gear member to drive it, other propellers mounted over the leading edge of the plane and provided with a gear member, and transmission means operatively connected to the gear members of these propellers and to said rear propeller so as to operate them in unison, said power producing means being operatively engaged with said transmission means.

9. The structure defined by claim 1, said operating means including reverse gearing for effecting rotation of the rear propeller in one direction while the front propellers rotate in the opposite direction, for the purpose specified.

ROBERT W. DAVIS.